United States Patent

Eberbach et al.

Patent Number: 5,704,331
Date of Patent: Jan. 6, 1998

[54] ENGINE ACCESSORY DRIVE

[75] Inventors: Hermann Eberbach, Nürtingen; Eberhard Mack, Notzingen; Volker Döring, Stuttgart, all of Germany

[73] Assignee: Mercedes-Benz AG, Stuttgart, Germany

[21] Appl. No.: 778,782

[22] Filed: Jan. 6, 1997

[30] Foreign Application Priority Data

Jan. 9, 1996 [DE] Germany .................. 196 00 563.9

[51] Int. Cl.[6] ........................................... F02B 77/00
[52] U.S. Cl. .......................... 123/198 R; 123/196 R; 123/198 C
[58] Field of Search ................... 123/198 R, 198 C, 123/196 R

[56] References Cited

U.S. PATENT DOCUMENTS 2,951,391  9/1960  Kolbe .
4,214,568  7/1980  Ito et al. .................. 123/198 R

FOREIGN PATENT DOCUMENTS 1 045 161  11/1958  Germany .
2854992    7/1980   Germany .
33 26 684  2/1985   Germany .
38 26 326  2/1989   Germany .
40 37 683  6/1992   Germany .

Primary Examiner—Noah P. Kamen
Attorney, Agent, or Firm—Klaus J. Bach

[57] ABSTRACT

In an accessory unit drive arrangement of an internal combustion engine the accessory unit is mounted on the engine such that its drive shaft is arranged in axial alignment with an engine-operated shaft. The drive shaft is coupled to the engine-operated shaft by a coupling structure which includes a pin which projects axially eccentrically from the end face of the engine-operated shaft and engages a carrier mounted on the drive shaft of the accessory unit. The engine-operated shaft is supported by a friction bearing and a lubricant collecting space is in communication with the friction bearing so as to collect lubricant leaking from the bearing for the lubrication of the coupling structure.

6 Claims, 2 Drawing Sheets

ENGINE ACCESSORY DRIVE

BACKGROUND OF THE INVENTION

The invention relates to an accessory unit drive for an internal combustion engine wherein the accessory unit has a drive shaft disposed in axial alignment with an engine-operated shaft and is driven thereby via a drive coupling.

DE 33 26 684 A1 discloses an internal combustion engine with a cam shaft and an accessory unit with a shaft which is arranged coaxially with the camshaft. The accessory unit is coupled for rotation with the cam shaft by a coupled mounted on the accessory unit shaft and connected to the camshaft.

This arrangement, however has the disadvantage that vibrations of the camshaft are directly transmitted to the accessory unit. As a result, sensitive accessory units are subject to increased wear.

It is the object of the present invention to provide a drive for an engine accessory unit which is simple and reduces wear and the transmission of vibrations from the camshaft, that is an engine-operated shaft, to the accessory unit.

SUMMARY OF THE INVENTION

In an accessory drive arrangement of an internal combustion engine, the accessory unit is mounted on the engine such that its drive shaft is arranged in axial alignment with an engine-operated shaft. The accessory drive shaft is coupled to the engine-operated shaft by a coupling structure, which includes a pin axially projecting eccentrically from the end face of the engine-operated shaft and engaging a carrier mounted on the drive shaft of the accessory unit. The engine-operated shaft is supported by a friction bearing which is lubricated by a lubricant. A lubricant collection space is arranged in communication with the friction bearing for collecting lubricant leaking from the friction bearing. The lubricant collected in the collection space is used for the lubrication of the carrier coupling.

The arrangement according to the invention is quite simple in its design, and consequently, is simple to install. Also, transmission of vibrations from the camshaft to the accessory unit shaft is eliminated or at least greatly reduced.

As the lubricant leaking from the bearing is collected and is utilized to lubricate the coupling wear of the coupling is essentially eliminated.

Further embodiments and the advantages thereof will become apparent from the following description of the invention on the basis of the accompanying drawings.

DESCRIPTION OF PREFERRED EMBODIMENTS

Figure 1:
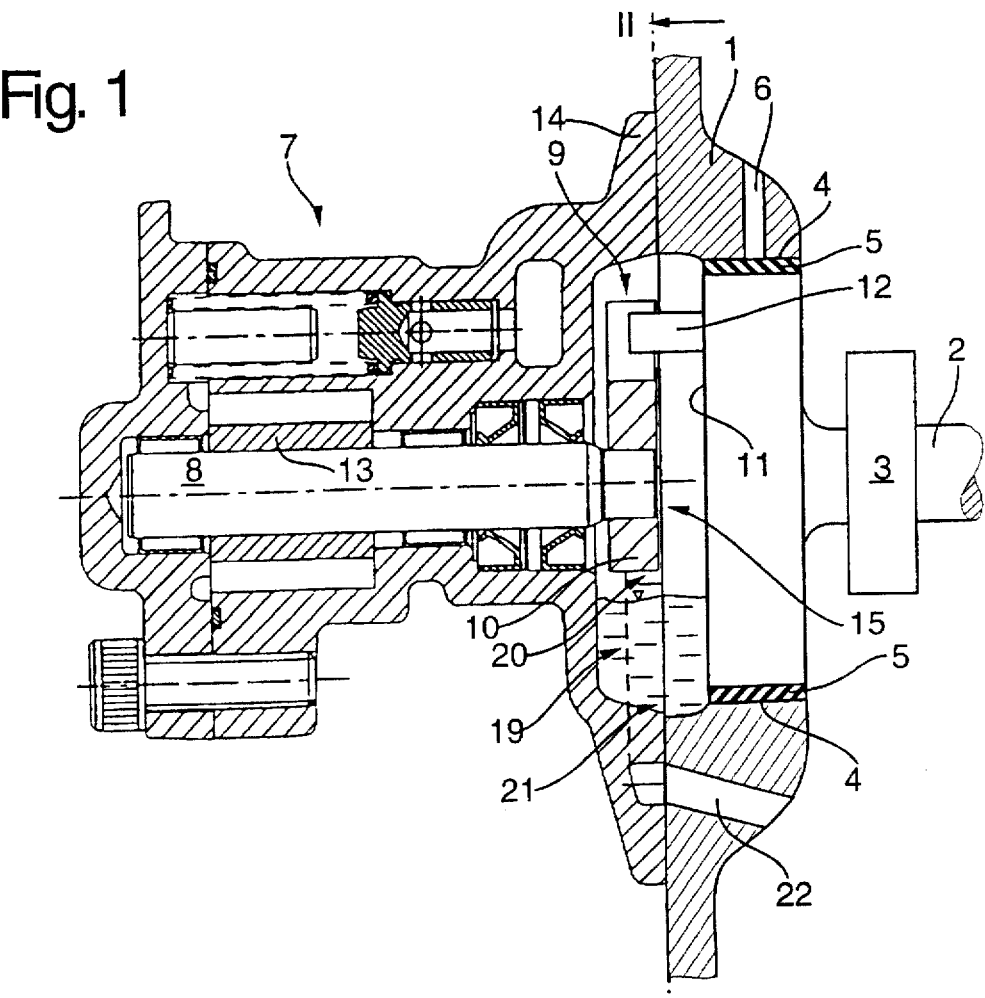
FIG. 1 is a cross-sectional view of a portion of a crankcase of an internal combustion engine with an accessory drive unit mounted thereon and connected to a camshaft by a coupling arrangement.

The figures show a portion of the crankcase 1 of an internal combustion engine including a partially shown camshaft 2 with a cam 3, the camshaft 2 being supported at its end by a bearing 4 disposed in the crankcase 1. For supplying lubricant to the bearing surface 5, the crankcase 1 includes a lubricant bore 6.

An accessory drive unit generally designated by the numeral 7, which has a drive shaft 8 arranged coaxially with the camshaft 2, is mounted on the crankcase, for example by way of a flange 14. The drive shaft 8 is driven by the camshaft by way of a carrier coupling 9. The carrier coupling 9 comprises a carrier 10 which is firmly mounted on the drive shaft 8 for rotation therewith and a pin 12 eccentrically mounted on the front end of the camshaft 2. The carrier 10 comprises a disc-like body 16 with a radially outwardly extending finger 17. The transition area between the disc-like body 16 and the finger 17 is shaped to form a cradle 18 wherein the pin 12 is engaged by the carrier 10 during rotation of the camshaft 2.

The function, the type, and design of the accessory unit is not important with regard to the present invention and it is described therefore only briefly. The embodiment of FIG. 1 shows a fuel pump whose drive shaft 8 is rotated at the same speed as the camshaft 2 of the internal combustion engine by way of the carrier coupling 9. At the opposite end of the drive shaft 8, there is the actual pump unit 13 mounted on the drive shaft 8 for rotation therewith so that the fuel pump is operated at the speed of the camshaft 2.

In the area of the carrier coupling 9, the crankcase 1 and the housing 14 of the accessory drive unit 7 include cavities forming a lubricant collecting space 15. The collecting space 15 must be large enough so that the circulating movement of the pin 12 and the carrier is not impeded. The collecting space 15 serves to collect leakage lubricant leaking out of the bearing at the front end 11 of the camshaft 2. In order to prevent the lubricant from leaving the collecting space 15 in an uncontrolled manner, the housing 14 of the accessory unit 8 is sealed with respect to the crankcase 1 and with respect to the accessory unit 8. The leakage lubricant is collected in a sump 19 at the bottom of the collecting space 15. With each turn of the camshaft, the pin 12 and the carrier 10 slosh through the sump 19 so that the carrier coupling 9 in the cradle area 18 is always sufficiently lubricated. The lubrication is necessary in order to prevent wear at the pin 12 and the carrier 10, respectively, in the cradle area 18 because of relative movements of these parts 12, 10 which are caused by the vibrations of the camshaft 2.

Figure 2:
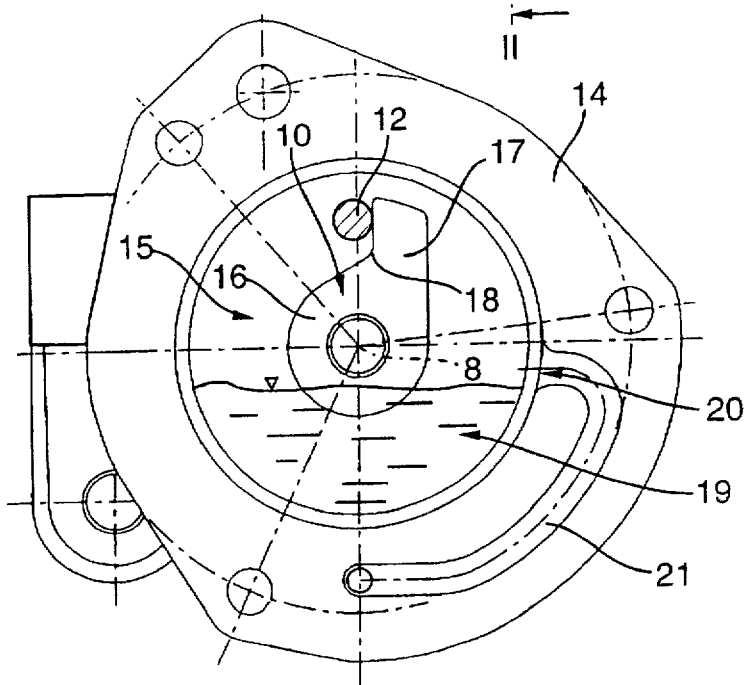
FIG. 2 shows the coupling arrangement of FIG. 1.

In order to prevent the whole collecting space 15 from being filled with lubricant, an overflow 20 may be provided in the housing 14 of the accessory unit 7 as indicated in the FIGS. 1 and 2. The overflow consists of a passage 21 which branches off the side of the storage space 15 and extends to the lower part of the housing 14 and of a bore 22 which connects the passage 21 with the crankcase 1. By selection of the level at which the passage 21 branches off the collecting space 15, the volume of the sump can be determined. Preferably, the overflow 20 is arranged at such a level that sufficient lubrication of the carrier coupling 9 is insured but not at a higher level. An unnecessarily large lubricant volume in the collecting space 15 would lead to undesirable friction losses because of increased sloshing energy losses.

In addition to the arrangement of the overflow 20 in the housing 14 as shown in the embodiment of FIGS. 1 and 2, it is possible to arrange the passage 21 as well as the bore 22 in the crankcase 1. Furthermore, it is possible to provide for the collecting space 15 by providing a cavity exclusively in just one of the crankcase 1 or the housing 14 of the accessory unit 7.

The course of the passage 21 and of the bore 22 is preferably so selected that excess lubricant returns from the storage space 15 back to the crankcase 1 solely by gravity.

Figure 3:
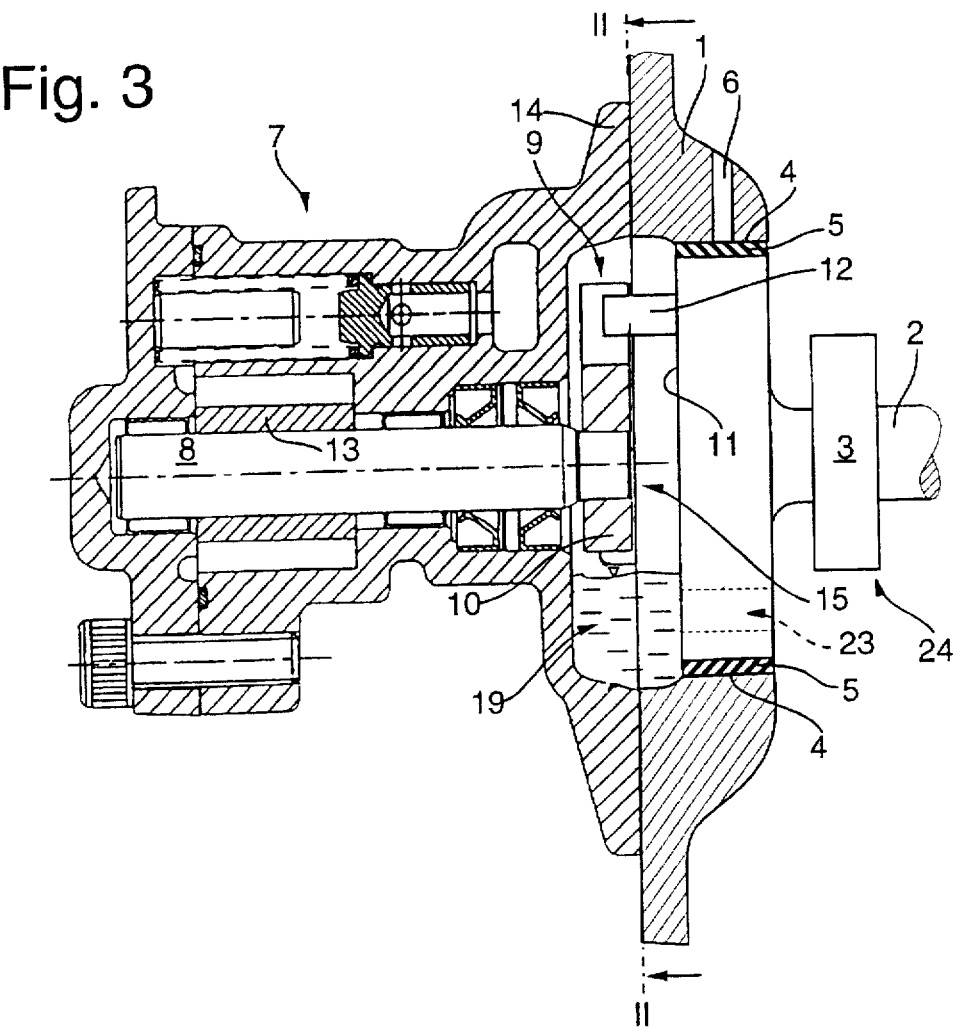
FIG. 3 shows the arrangement of FIG. 1 with a different lubricant supply arrangement.
Figure 4:
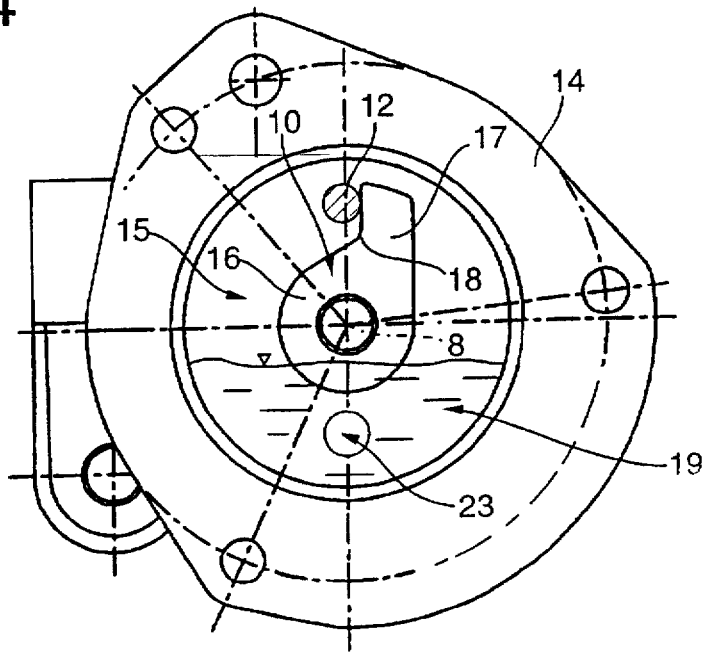
FIG. 4 shows the coupling arrangement of FIG. 3.

Another embodiment for the lubrication of the carrier coupling 9 is shown in FIGS. 3 and 4, wherein identical parts are designated by the same reference numerals as used in FIGS. 1 and 2. In this embodiment, the overflow 20 and the passage 21 are eliminated. In this case, the collecting space 15 is in communication with the crankcase interior 24 of the internal combustion engine by way of a through-bore 23 extending through the front end of the crankshaft 2. Preferably, the through bore 23 is displaced from the location of the bolt 12 by 180°.

The through-bore 23 is a lubricant admission and also a lubricant discharge passage. When the internal combustion engine is at a stand still, the lubricant drains out of the collecting space 15 into the crankcase space 24 down to the bottom edge of the through-bore 23. Consequently, the lubricant level remaining in the collection space 15 depends on the angular position of the camshaft 2 and, together therewith, the through-bore 23 when the engine is not operating. During operation of the engine, lubricant can enter the collecting space 15 by way of the lubricant bore 6 and/or the through bore 23. However, lubricant can also leave the storage space 15 by way of the through bore 23 and flow into the crankcase 24 of the engine. As a result, during engine operation, an equilibrium ms established between lubricant in-flow and out flow whereby a lubricant level is established at which the through bore is fully immersed into the lubricant sump 19 when it is in its lowermost position as shown in FIG. 3. This arrangement has the advantage that, upon engine startup, the collecting space 15 is filled with lubricant more rapidly than with the first embodiment.

The invention is of course, not limited to a carrier coupling between the drive shaft 8 of an accessory drive unit 7 and a camshaft 2 of an internal combustion engine. Such a coupling arrangement may also be provided for coupling an accessory unit to the crankshaft or another engine-operated component.

Generally, lubricant leaking from a friction bearing may be collected in a collecting space, that is a lubricant sump, for the lubrication of areas which would otherwise be subjected to frictional wear. The sump preferably includes an overflow for the return of excess lubricant to the lubricant circulating system. Such an arrangement may be used not only for a carrier coupling as shown herein, but it may be used in connection with any friction bearing.

What is claimed is:

1. A drive arrangement for an accessory unit of an internal combustion engine, said accessory unit having a drive shaft disposed in axial alignment with an engine-operated shaft and having an end face disposed opposite an end face of said engine-operated shaft said engine operated shaft being supported by a friction bearing to which a lubricator is supplied, and a carrier coupling disposed between said end faces for coupling said engine-operated shaft with said drive shaft, said carrier coupling including a pin projecting eccentrically in an axial direction from the end face of said engine operated shaft and a carrier mounted on said drive shaft and having a carrier structure engaging said pin and a lubricant collecting space arranged in communication with said friction bearing lubricant leaking from said friction bearing for the lubrication of said carrier coupling.

2. A drive arrangement according to claim 1, wherein said carrier has the shape of a disc with a radially outwardly projecting finger extending from said disc such that a cradle-like transition area is formed thereby wherein said pin is received during rotation of said engine-operated shaft.

3. A drive arrangement according to claim 1, wherein said collecting space is provided with an overflow by way of which excess lubricant is returned from said collecting space to the engine lubricating system.

4. A drive arrangement according to claim 1, wherein said crankcase has a lubricant admission bore for admitting lubricant to said friction bearing and wherein said lubricant collecting space is provided in the area of said carrier coupling as a cavity formed in at least one of said crankcase and said accessory unit.

5. A drive arrangement according to claim 1, wherein said lubricant collecting space is a cavity formed in at least one of said crankcase and said accessory unit housings in which also a portion of said carrier coupling is disposed and said engine operated shaft includes a through-bore extending between said collecting space and the crankcase of said internal combustion engine.

6. A drive arrangement according to claim 5, wherein said through-bore is angularly displaced with respect to said pin by 180°.

* * * * *